(12) United States Patent
Finke

(10) Patent No.: US 6,273,699 B1
(45) Date of Patent: Aug. 14, 2001

(54) DEVICE FOR MANUFACTURING PLASTIC FILM

(76) Inventor: Udo Finke, Am Hirschgarten 15, D-84175 Gerzen (DE)

( * ) Notice: Subject to any disclaimer, the term of this patent is extended or adjusted under 35 U.S.C. 154(b) by 0 days.

(21) Appl. No.: 09/310,427

(22) Filed: May 12, 1999

(30) Foreign Application Priority Data

May 19, 1998 (DE) .............................................. 198 22 400

(51) Int. Cl.[7] .................................................. B29C 47/90
(52) U.S. Cl. .................. 425/72.1; 425/326.1; 425/387.1
(58) Field of Search .............................. 425/72.1, 326.1, 425/387.1, 392

(56) References Cited

U.S. PATENT DOCUMENTS

| | | | | |
|---|---|---|---|---|
| T915,014 | * | 10/1973 | Goldman | 425/72.1 |
| 3,555,604 | * | 1/1971 | Pahlke | 425/72.1 |
| 3,725,519 | * | 4/1973 | Seifried et al. | 425/72.1 |
| 3,888,609 | * | 6/1975 | Saint Eve et al. | 425/72.1 |
| 4,399,094 | * | 8/1983 | Fujitani et al. | 425/72.1 |
| 4,473,527 | * | 9/1984 | Fujisaki et al. | 425/72.1 |
| 4,728,277 | * | 3/1988 | Planeta | 425/72.1 |
| 4,749,346 | * | 6/1988 | Planeta | 425/72.1 |
| 4,842,803 | * | 6/1989 | Bose et al. | 425/72.1 |
| 5,368,460 | | 11/1994 | Weavil et al. | |

FOREIGN PATENT DOCUMENTS

| | | |
|---|---|---|
| 041 803 | 12/1981 | (EP) . |
| 508 167 | 10/1992 | (EP) . |
| 522 487 | 1/1993 | (EP) . |
| 01044624 | 2/1989 | (JP) . |
| WO 91 14173 | 9/1991 | (WO) . |

* cited by examiner

Primary Examiner—Nam Nguyen
Assistant Examiner—Joseph Leyson
(74) Attorney, Agent, or Firm—Peter E. Rosden

(57) ABSTRACT

A device for improving the possibilities of process control in blown film manufacture is described. In blown film manufacture, the plastic material is extruded in the form of a tube from a slot die and is pulled off while maintaining an internal pressure in the tube as it cools during chemical formation of the film material. According to the invention, the film tube is flushed on all sides in this cooling area with an air stream that has been conditioned in terms of temperature and air purity, and this flushing air stream, in turn, is shielded against outside influence by a partition surrounding the area. Preferably, the flushing air stream is divided into a number of partial air streams.

1 Claim, 3 Drawing Sheets

DEVICE FOR MANUFACTURING PLASTIC FILM

FIELD OF THE INVENTION

The invention relates generally to a method and a device for manufacturing a single or multilayer plastic film from a plastic raw material or a combination of several materials, said materials being extruded from a slot die and then being allowed to cool accompanied by chemical formation of the film material.

BACKGROUND OF THE INVENTION

Film production generally employs a blowing method or a casting method. The starting material is a plastic granulate that has graded properties, but has characteristics that differ from one batch to the next. In addition, the raw material can differ in temperature, moisture content, and aging. Differences in the material, especially the molecular structure, can result in different development of sensible heat in a worm conveyer screw of the extruder, which also influences the result. It is known that a conditioner located between the raw material silo and the extruder can adjust the state of the material suitably for the process.

The actual formation or crystallization then takes place after extrusion when the plastic is already in the film form, during the cooling and hardening of the film.

The quality of the film that is eventually obtained is evidenced by freedom from pinholes, in other words inclusions such as gel bodies, foreign matter, and burned plastic deposits, for example, as well as by the material and thickness homogeneity of the film and its uniform transparency, which has been shown to be an indicator of morphological structure. According to the prior art, when film sections that cannot be used are produced, they are destroyed and an attempt is made to adjust the parameters at the extruder.

However, correction of the factors that influence the quality of the film turns out to be rather complex. Accordingly, it has not yet been possible to perform continuous real-time control of the properties of such films.

SUMMARY OF THE INVENTION

The invention relates to a method and a device for manufacturing a single or multilayer plastic film from a plastic raw material or a combination of several materials, said materials being extruded from a slot die and then being allowed to cool accompanied by chemical formation of the film material. During the cooling process, the extruded film passes through an air section for a certain distance. The device, in the case of blown film, has an extruder, or several extruders for a multilayer film, and a blow mold with an annular nozzle and air nozzles enclosed thereby for forming and maintaining an air bubble in the expelled tubular film.

The invention is intended to improve the possibilities of monitoring the process as the film is manufactured. According to the invention, this is accomplished by the fact that the film is treated by a stream of conditioned air in the vicinity of the air section through which the film material passes during the cooling process after the slot die. The air stream has been conditioned in terms of temperature and air purity. It is blown around the film on all sides, moving it in the same direction as the film cooled by it and shielding it against external influences by a partition or special flow-optimized encapsulation. Formation of the film material in this air section proceeds in a largely uncontrolled fashion. Both additional heat sources and a sudden lateral cold draft or similar asymmetric influences cause the film to shrink more rapidly on one of the two sides than on the other, with the result that the morphology is not even over the circumference and exhibits arbitrary properties in the extrusion direction such as nonuniform plane position, transparency, and bendability. In the case of blown films, these defects account for approximately one half of all the rejects. According to the invention, as a result of the flushing of this area of the air section according to the invention with a conditioned air stream which also includes undisturbed flow and the shielding of this area by encapsulation, the processes during cooling of the film material can be controlled and a possible influence is obtained that allows control with the control loop closed, for example, with constant monitoring of the film transparency.

Secondly, the method according to the invention provides a continuous measurement, as extensive as possible, of characteristic product properties of the cooled finished film, especially its transparency, which is scanned with an optical measuring system so that the product values of the cooled finished film are continuously measured and regulated in real time by controlling influential parameters along the film production line as a function of the measured values. These parameters can also affect only the conditioning of the raw material, but preferably this regulation is also combined with air flushing and encapsulation. As far as the handling of blown films is concerned, a device is especially preferred wherein the chamber adjoining the blow mold in which the extruded film is cooled is encapsulated by a protective housing that encloses this chamber snugly so that disturbing influences such as asymmetric heat radiation from the extruder or a sudden cold draft when the door is opened are kept away from the air stream flowing over the film.

The conditioning of the air flow is intended particularly for controlling the properties of temperature and air purity, especially freedom from particles and microorganisms as well as the moisture content.

When blown film is produced, the foil tube, until it is flattened and wound, has an air section of several meters to travel, for example 10 meters in a large system. According to one special and preferred embodiment of the invention, the air flow along this air section is divided into partial air streams each of which envelops the film, especially the film tube, along a partial stretch and each of which is produced in succession in the flow direction. At the beginning of the next partial air stream, the previous air stream is drawn off again or even deflected outward and carried away, recycled, for example. The partial air streams can therefore be adjusted to meet the local requirements of the tube, for example turbulent in the lowermost portion and uniformly laminar on all sides in the upper sections.

As an example of the dimensioning of such a capsule housing, where the annular nozzle has a diameter of d, the resultant foil tube to be cooled has a diameter of approximately 4d and the surrounding cylindrical capsule housing then advantageously has a diameter of 12d. In smaller systems, a narrower air stream chamber is sufficient while in larger systems of course the air stream chamber is also larger and additional parts of the installation can also be accommodated therein, such as gratings on which personnel walk.

The regulation of the characteristics of the film produced, especially its transparency, in the area downstream from the slot die also influences the conditioning properties of the air in the air stream and the strength and speed of the air stream. As an alternative or in addition, the regulation also influences the conditioning and transport of the raw material, especially the extrusion pressure, temperature, and moisture content, upon which the viscosity of the plastic melt in turn depends.

Further details, advantages, and improvements on the invention follow from the description below of preferred embodiments with reference to the drawings.

DETAILED DESCRIPTION OF THE INVENTION

Figure 1:
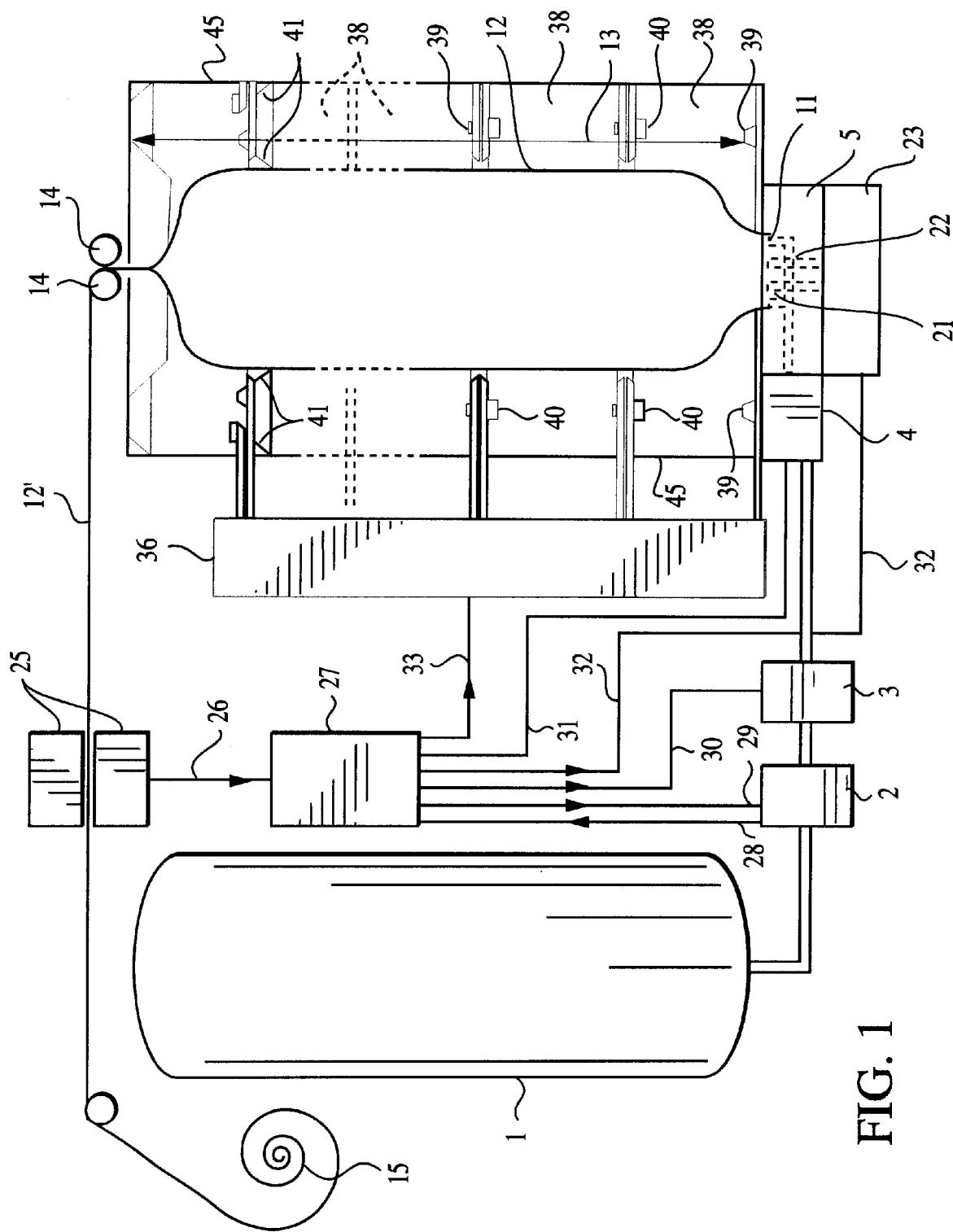
FIG. 1 is a schematic diagram of a system for manufacturing blown films according to the invention.

In the system according to FIG. 1, plastic granulate is conducted from a silo 1 through a measuring and conditioning device 2 and a device 3 for input metering through an extruder 4 to a blow mold 5. In extruder 4, the material is melted and moves forward under pressure to an annular nozzle 11 in the blow mold which initially expels the material in an initially viscous form in an annular shape and produces a standing tube 12 by a pulling system and by blowing. This tube is pulled upward constantly and simultaneously cooled and solidified. After traveling a sufficient distance in air 13, the solidification process is sufficiently advanced that the tube is flattened by rollers 14 and conducted further to a winding station 15.

The annular nozzle 11, used even for multilayer films, is surrounded in known fashion, not shown in detail in the drawing, by a cooling ring and has a Venturi profile that produces a pressure distribution that pulls the wall of the tube outward and produces an increase in diameter relative to the diameter of annular nozzle 11, as well as stabilizing the tube. Within annular nozzle 11 is an internal cooling system with an air blower nozzle 21 and an air suction nozzle 22 that keep tube 12 in an inflated column-shaped state. The air inside of the tube must be constantly replaced to carry away heat. Nozzles 21 and 22 are connected by corresponding lines to an air delivery and conditioning device 23 that keeps the internal pressure in tube 12 and the state of the air present therein within certain value ranges.

To the extent described so far, the system corresponds to the prior art.

Tube 12', folded flat after leaving the gap between rollers 14, passes through a test station 25 that constantly monitors, using different techniques (especially a capacity test and a transparency test performed with a scanning camera), the characteristics and the homogeneity of the manufactured film and delivers the corresponding measured values as signals over a line 26 to a data processing system (DP system 27). DP system 27 also receives, over a line 28, measured values that indicate the state of the plastic granulate and, after processing the values sent to it, sends commands over a line 29 to the measuring and conditioning device 2 for conditioning, for example pre-drying, of plastic granulate. DP system 27 further sends commands over a line 30 to device 3 for input metering and sends commands over a line 31 to extruder 4 which, depending on these commands, determines the temperature of the molten plastic that is delivered to annular nozzle 11. DP system 27 influences air delivery and conditioning device 23 through data transmitted over a line 32 which is intended especially to keep the internal pressure of tube 12, as well as the other states of the air contained in tube 12, within limits.

In addition, DP system 27 transmits commands over a line 33 to an air delivery and conditioning device 36. The function of DP system 27 in this case is not limited to controlling the supply of raw material to annular nozzle 11, but also includes control of the processes in the wall of tube 12, namely the cooling and chemical formation that occur there. In the system according to FIG. 1, conditions are created in the vicinity of tube 12 that are uniform and adapted to the chemical processes in the respective portions of tube 12. Air section 13 is divided into individual partial air sections 38, each of which, in an annular arrangement around tube 12, has a row of blowing nozzles 39 at its lower end and a row of suction nozzles 40 or baffle plates 41 at its upper end. The nozzle arrangements are each connected with the air delivery and conditioning device 36 that appropriately adjusts the conditions of the air streams in the partial air sections, in other words the air throughput and the flow rate, air temperature, and air moisture content, etc.. The air blowing nozzles 39 blow air in a direction essentially parallel to the extrusion direction of plastic annular nozzle 11 and are located coaxially to the axis of plastic annular nozzle 11. A first arrangement of air blowing nozzles 39 is located in the vicinity of and surrounding plastic annular nozzle 11. Each arrangement of air suction nozzles 40 is located at a distance from one of the arrangements of air blowing nozzles 39 and surrounding the axis of plastic annular nozzle 11. The arrangements of air blowing nozzles 39 and the arrangements of air suction nozzles 40 are arranged pairwise with respect to each other wherein an arrangement of air blowing nozzles 39 abuts an arrangement of air suction nozzles 40. To guide the air streams in the partial air sections 38 and to shield them against external influences, which can be very strong and disturbing especially in large holes, tube 12 and air sections 13, 38, as well as the arrangements of nozzles 39, 40 and diaphragms 41, are sealed by a cylindrical housing 45 and encapsulated. The processes in the tube wall therefore take place in a completely undisturbed environment.

Figure 4:
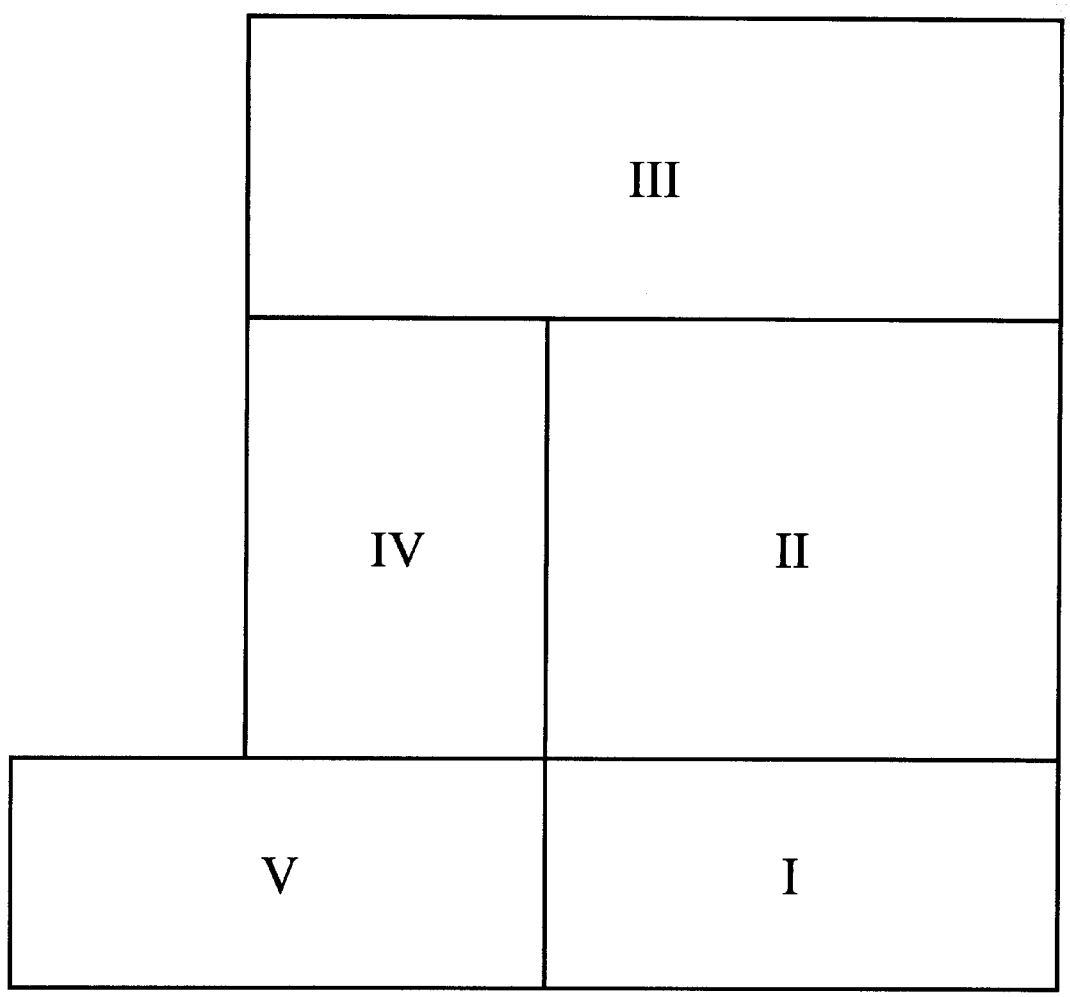
FIG. 4 is a regulating diagram for the method according to the invention.

As a result of the division of air section 13 into partial air sections 38, each of which can be controlled separately in terms of its partial air flow, as a function of material and other parameters, the appropriate conditions can be provided and produced for each partial section. Chemical formation can therefore be controlled at any time to produce complete homogeneity but also can be optimized in terms of the film characteristics. In an improvement on the method, the entire manufacturing process can be divided into individual method steps with separate monitoring of the steps in the various sections, which are viewed as separate chambers. This is shown in FIG. 4. The individual method steps are separated in order to prevent mutual influence. Each method step is encapsulated in an enclosed process chamber so that the process can proceed undisturbed by external and mutual influences. In-line measuring systems allow significant measured values that can be assigned to the individual influential parameters. The goal in this case is that in-line measured product quality data, evaluated regulating behavior, stable process data, and relevant evaluated material data can be fed through a DP system to a control and regulating system, with the desired quality being obtained through the measured product quality. The corresponding chambers of the process sections are shown in FIG. 4 in detail wherein:

Chamber I comprises an extrusion chamber. Constant extrusion conditions produced by a conditioned environment, monitored material state, and metering, allow evaluation of the regulating behavior on the basis of stability and a DP system, as well as the attribution of deviations in an in-line measured quality criterion to an influential parameter. It is possible to determine heat losses from the difference between the energy applied and the heat loss. The difference is proportional to the energy content (enthalpy) of the plastic melt.

Chamber II comprises a process chamber. The process is stabilized and measurable here. Measurement data such as the temperature above the height of the bubble and microdust contamination of the individual defined sections are significant and can be attributed to other process procedures.

Chamber III comprises a measurement chamber. On the basis of the processes that previously proceeded in a stable manner, measurement data such as optical measurement of transparency, thickness distribution via infrared systems, and inclusions in the film can be gathered. This data also functions as predictors and can be assigned to other process data by the DP system.

Chamber IV comprises a recycling chamber. Under conditioned conditions, deliberate after-treatment is possible, for example tempering or restructuring of the mechanical shape, printing, etc.

Chamber V comprises a winding chamber. At this point, changes in the regulating behavior during winding such as web tension and winding quality can be traced back to process steps.

The system shown is therefore an intelligent quality feedback process control (IQFP) system.

Figure 2:
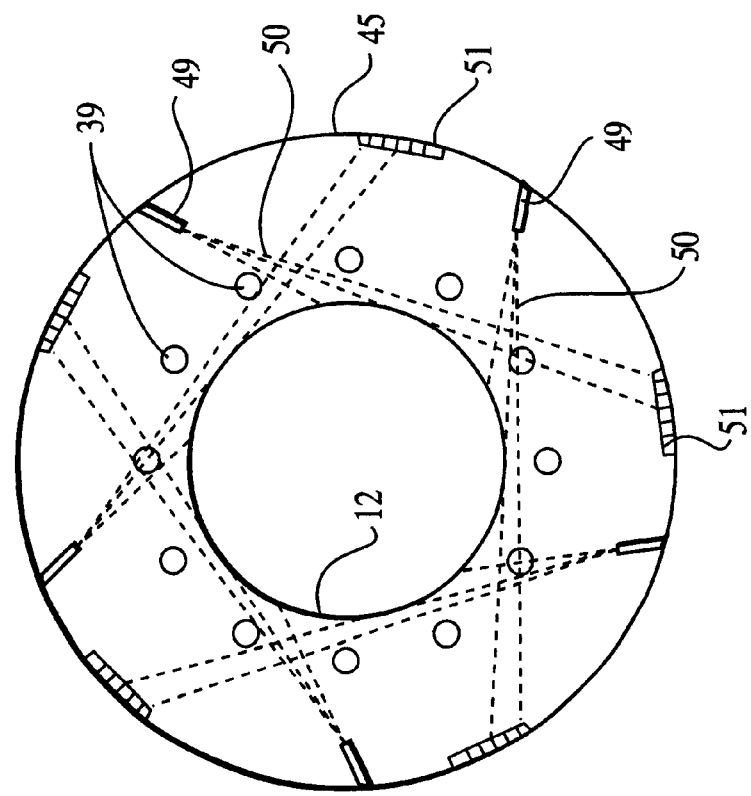
FIG. 2 is a section through a portion of the system according to a modified design.

FIG. 2 shows an even more extensive differentiation of the method and the device. In the section made through a partial air section, the blowing nozzles 39 can be seen at the bottom. In between are arrangements of ray sources 49 that emit beams 50 at an acute solid angle and are located opposite receiving grids 51 that receive beams 50 and deliver a signal that indicates the shadow of tube 12. Such arrangements of ray sources 49/receiving grids 51 are installed at different levels in housing 45. The results of the receiving grids 51 are transmitted to regulator 27 which immediately recognizes possible deviations in the travel of the tube wall. In this design the different blowing nozzles 39 of a common partial section 38 can be controlled separately, at least as far as throughput rate and air flow rate are concerned, so that asymmetries can immediately be controlled.

Figure 3:
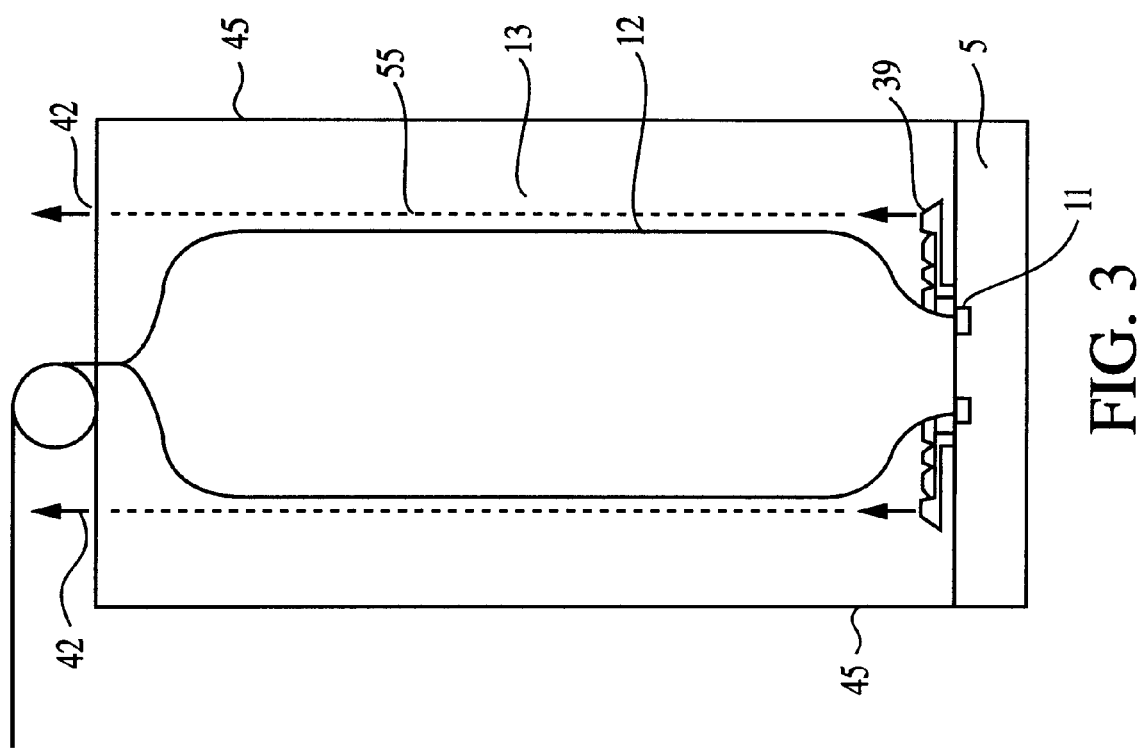
FIG. 3 is a schematic view of a portion of the system in a modified design.

FIG. 3 shows schematically a design simplified by comparison with the system in FIG. 1 for a small system. Here, a single set of blowing nozzles 39 is located in housing 45 and produce an essentially cylindrical air curtain 55 that extends from the bottom to the top and surrounds tube 12. The air curtain covers the entire air section 13 and escapes at the top through outlet openings 42 from housing 45. The air for air curtain 55 comes from the air delivery and conditioning device 23 and has a state optimized for the formation of the wall of tube 12.

What is claimed is:

1. A device for producing by blow molding a tubular plastic film from one or more combined plastic raw materials that are extruded and cooled with chemical formation of the film comprising:

an extruder (4);

a blow mold (5) connected to said extruder;

a chamber adjacent to said blow mold wherein cooling of the extruded film occurs;

a protective housing (45) snugly enclosing said chamber;

a stretch of air (13) within said chamber through which the extruded film (12) passes for a certain distance during the cooling process;

a plastic annular nozzle (11) within said blow mold;

air nozzle means (21 and 22) located within said plastic annular nozzle for maintaining an air bubble in the extruded tubular film;

an air-conditioning station (23, 36) located outside of said protective housing;

a plurality of air blowing nozzle arrangements (39) connected to said air-conditioning station, having blowing directions essentially parallel to the extrusion direction of said plastic annular nozzle and being located within said protective housing coaxially to the axis of said plastic annular nozzle (11) which axis is surrounded by the extruded film (12), a first one of the air blowing nozzle arrangements being located in the vicinity of and surrounding said plastic annular nozzle (11);

a corresponding plurality of air suction nozzle arrangement means (40) each located at a distance from one of said air-blowing nozzle arrangements (39) and surrounding said axis for drawing away the air blown out by said air blowing nozzle arrangement over the film;

wherein said air blowing nozzle arrangements and said air suction nozzle arrangement means are arranged pairwise with respect to one another and the pairs of nozzle arrangements and arrangement means each abut one another.

* * * * *